United States Patent [19]
Prior

[11] Patent Number: 6,029,637
[45] Date of Patent: Feb. 29, 2000

[54] INDUCTION ASSEMBLY FOR SUPERCHARGED INTERNAL COMBUSTION ENGINE

[75] Inventor: Gregory Paul Prior, Birmingham, Mich.

[73] Assignee: General Motors Corporation, Detroit, Mich.

[21] Appl. No.: 09/212,670

[22] Filed: Dec. 16, 1998

[51] Int. Cl.⁷ ..................................................... F02B 33/44
[52] U.S. Cl. .................. 123/559.1; 123/563; 123/184.34
[58] Field of Search ................................ 123/559.1, 563, 123/184.31, 184.34

[56] References Cited

U.S. PATENT DOCUMENTS 4,932,368  6/1990  Abe et al. ................................ 123/563
5,392,751  2/1995  Matsubara et al. ................... 123/559.1

*Primary Examiner*—Noah Kamen
*Attorney, Agent, or Firm*—Laura C. Wideman

[57] ABSTRACT

An induction assembly for a supercharged internal combustion engine includes a housing and a supercharger with a rotor and gear plate assembly to produce pressurized air. The housing includes a rotor casing which defines a central chamber to house the rotor and gear plate assembly. The housing also includes a suction inlet to introduce air to the central chamber and an outlet to discharge pressurized air from the central chamber to a plenum. The housing further includes intake runners which are in fluid communication with the plenum. The intake runners are radially adjacent to the exterior of the rotor casing such that the rotor casing comprises the inner wall of the intake runners. The plenum is defined by a removable cover and the housing. The removable cover has a central lengthwise bead and rounded surfaces resulting in the plenum being rounded and divided longitudinally. This plenum shape provides a smooth redirection of air flow exiting the supercharger and distributes the pressurized air to the intake runners.

7 Claims, 3 Drawing Sheets

INDUCTION ASSEMBLY FOR SUPERCHARGED INTERNAL COMBUSTION ENGINE

TECHNICAL FIELD

The invention is directed to an induction assembly for a supercharged internal combustion engine.

BACKGROUND OF THE INVENTION

A supercharger compresses air to be delivered to an intake manifold of an engine. The increased air density enhances the combustibility of fuel, producing more engine power. With increased air pressure comes increased air temperature and as a result, an intercooler is a common accessory to cool the supercharged air for optimum engine efficiency. To maximize the effectiveness of the total supercharged induction system, it is desirable to have a compact system thereby minimizing airflow travel to minimize transients. It is also desirable to have a minimum of directional airflow changes to improve efficiency and power output.

Another factor affecting the efficiency of the supercharger is the tolerance between the rotor lobes and the rotor housing. During manufacturing the rotor housing may be slightly distorted by clamps holding the casting for machining. A design that minimizes this potential for distortion is beneficial.

The current practice in supercharged automotive engines, especially with intercoolers, is to have separate machined castings for the supercharger rotor housing and for the intake manifold. This method of construction requires precise location of the two castings relative to one another, fasteners to join them, and a gasket to seal the joint.

SUMMARY OF THE INVENTION

The present invention provides for a compact, low mass induction assembly for a supercharged internal combustion engine. To accomplish this end, the intake manifold and supercharger rotor housing are integrated into a single induction housing. The induction housing eliminates the need to assemble a separate rotor housing to an intake manifold thereby improving ease of assembly, mass, and cost. The induction housing includes a rotor casing defining a central chamber to house the supercharger and a plurality of intake runners adjacent to the exterior of the rotor casing. The rotor casing is the inner wall of the intake runners. This sharing of walls lowers mass, allows for improved optimization of the port shapes and directions, and provides a stiffer housing. The single housing also reduces the potential for rotor bore distortion during manufacture by allowing machining clamps to be positioned remote to the rotor casing on the induction housing. Moreover, since there is no bolted joint between a separate rotor housing and an intake manifold, the alignment of the supercharger drive pulley to the drive belt improves and may reduce noise originating from a misaligned belt drive.

The present invention also includes an intercooler positioned directly above the supercharger outlet and in close flow communication with the intake manifold. This intercooler arrangement provides cooling of the supercharged air at the supercharger exit and within the intake manifold thereby minimizing the travel distance and the complexity of the supercharged airflow path which minimizes transients including lag time and idle quality.

A cover encloses the intercooler above the supercharger and induction housing. The cover is uniquely shaped with a cleavage cross section, achieved by a central lengthwise bead and rounded surfaces, which stiffens the cover and reduces noise radiation. Importantly, it also provides a smooth transition and redirection of airflow from the intercooler to the intake runners. The cover is also readily detachable for ease of serviceability of the intercooler.

As a consequence of having a removable cover, an isolating seal may be disposed between the induction housing and the cover mating surfaces. This seal aids in isolating noise and pressure pulsations produced by the supercharger to minimize noise radiated by the cover. It also allows for the inherent relative growth and movement of the mating components due to thermal expansion.

The details, as well as other features and advantages of the invention, are set forth in the following detailed description and drawings.

DESCRIPTION OF THE PREFERRED EMBODIMENT

Figure 1:
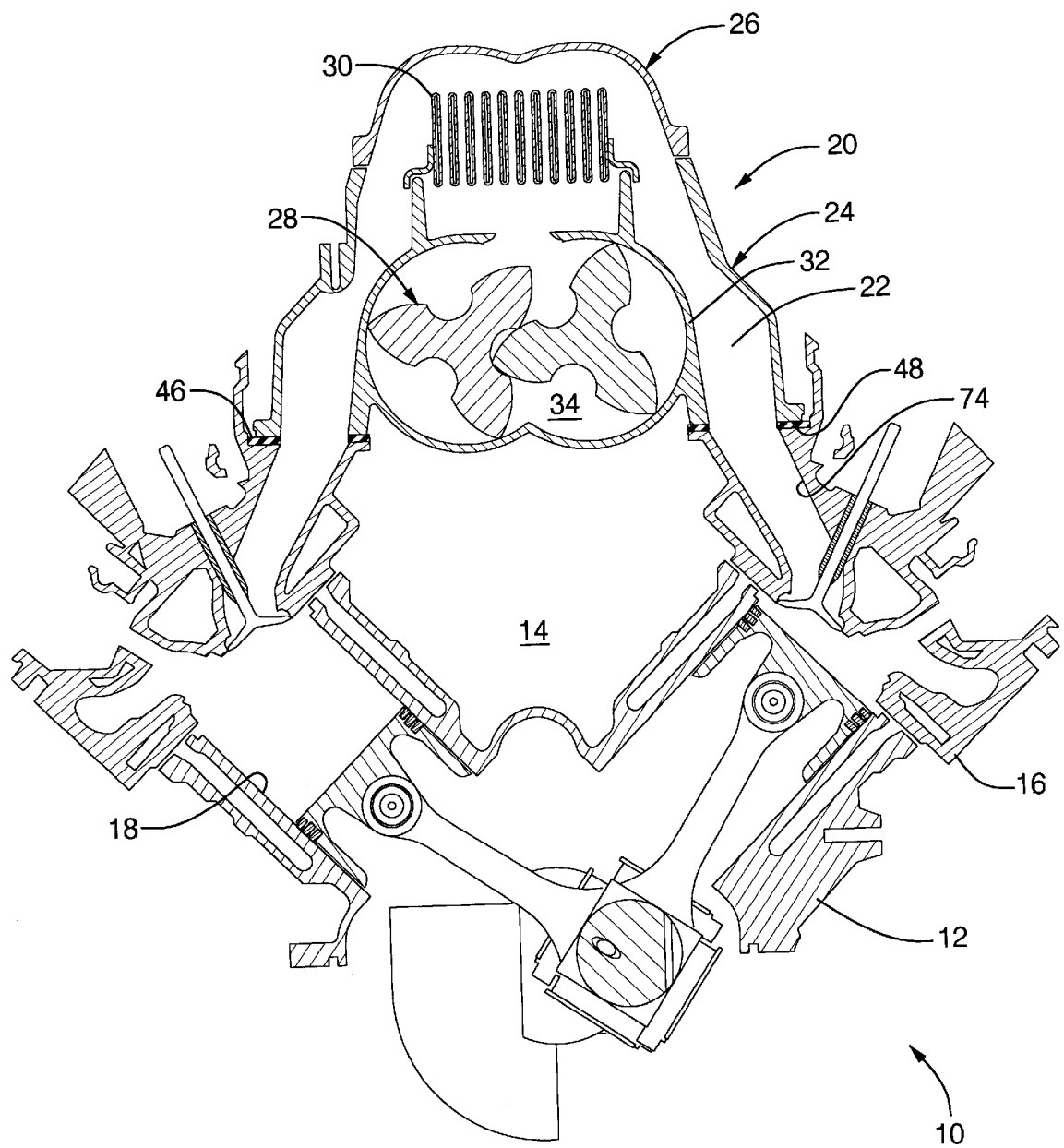
FIG. 1 is a schematic front view of a portion of a supercharged internal combustion engine embodying the present invention.

In FIG. 1 there is illustrated a portion of a supercharged internal combustion engine, generally referred to as 10, having two cylinder banks 12 in a V-configuration, defining a valley 14 therebetween. A cylinder head 16 is mounted to each cylinder bank 12 and each bank houses a plurality of engine cylinders 18.

Figure 2:
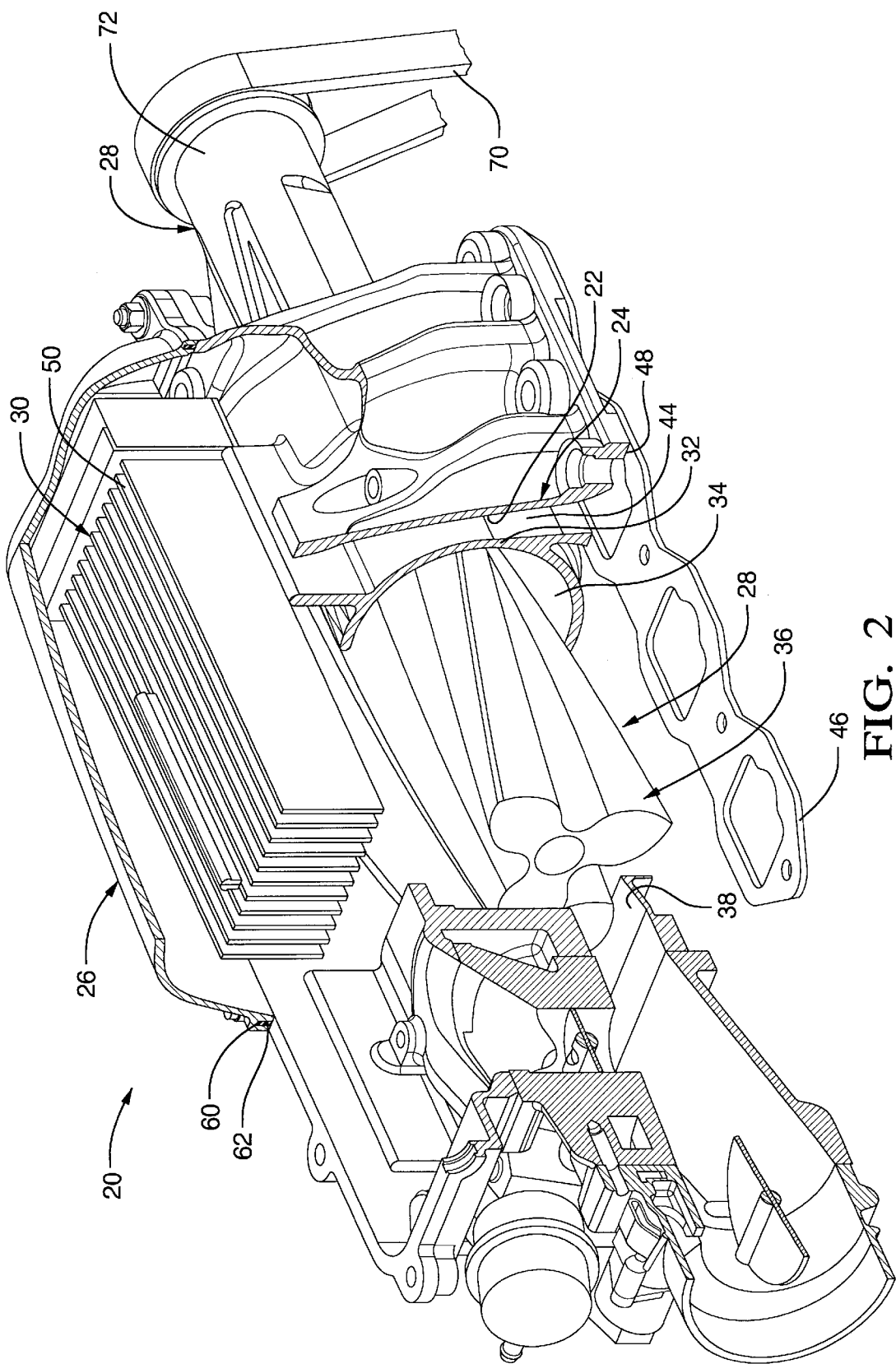
FIG. 2 is an isometric view, partially in section, of the induction assembly of the engine of FIG. 1.
Figure 3:
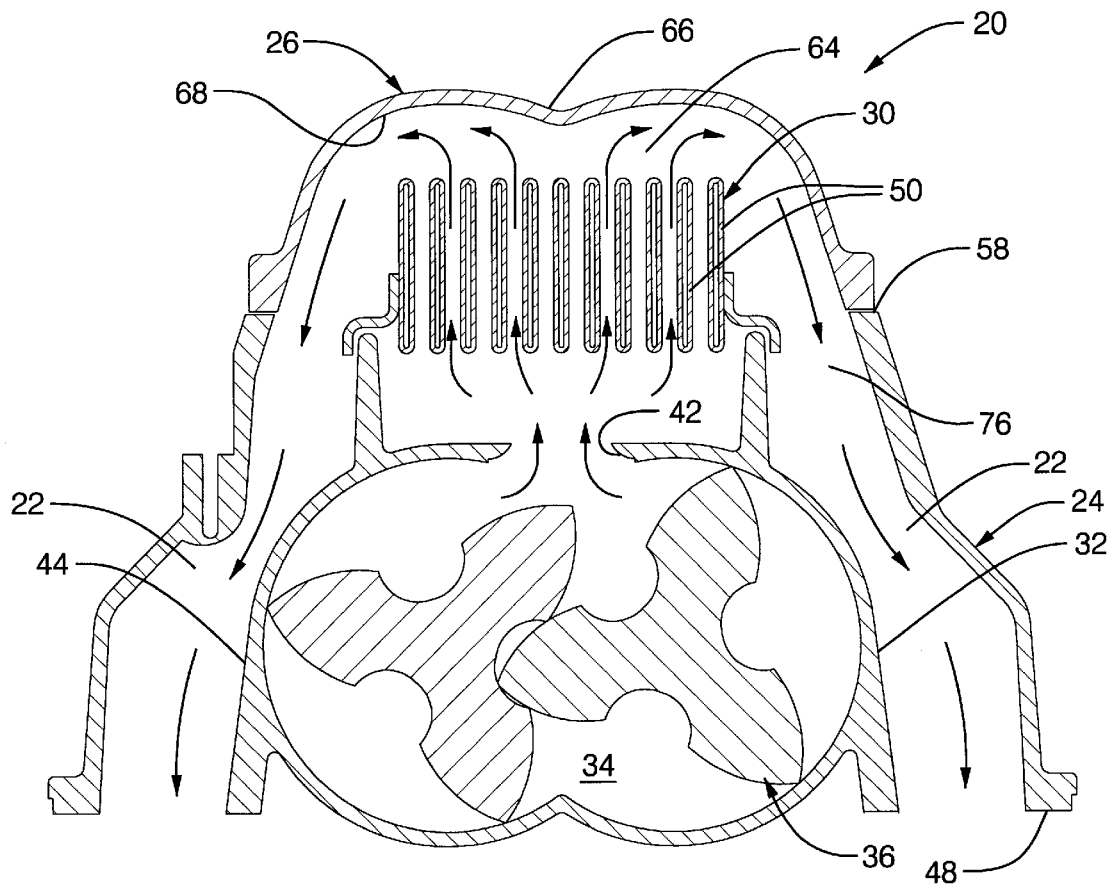
FIG. 3 is a sectional front view of the induction assembly of FIG. 2, illustrating airflow.

An induction assembly 20 supercharges and cools intake air and delivers the compressed air to the engine 10 through intake runners 22. The induction assembly 20 includes an induction housing 24 and a cover 26 enclosing a supercharger 28 and an intercooler 30. Refer to FIGS. 2 and 3.

The induction housing 24 integrates a supercharger housing portion and an intake manifold into a single simplified casting. First, with respect to the supercharger housing portion, the induction housing 24 is comprised of a rotor casing 32 which defines a central chamber 34 to house the supercharger rotor and gear plate assembly 36. The rotor casing 32 includes a suction inlet 38, shown in FIG. 2, at one end to introduce air to the supercharger 28 and an upwardly directed outlet 42 to discharge compressed air wherein the central chamber 34 establishes a communication between the inlet and outlet. Second, with respect to the intake manifold portion, the induction housing 24 includes the plurality of intake runners 22 radially adjacent to the exterior of the rotor casing 32 wherein the rotor casing comprises the inner wall 44 of the intake runners. This sharing of a common casting wall between the rotor casing 32 and intake runners 22 reduces the overall mass of the housing. In addition, the single induction housing 24 also reduces the potential for distorting the rotor casing 32 during manufacture by allowing machining clamps to be positioned remote or outboard of the rotor casing on the induction housing.

The induction housing 24 is mounted to the cylinder heads 16 such that the supercharger 28 occupies a portion of the valley 14 of the engine 10. Housing gaskets 46 are interposed between a lower mating surface 48 of the housing 24 and the cylinder heads 16.

The intercooler 30 is shown as an air-water intercooler, with lengthwise coils 50 to circulate coolant throughout. Alternatively, an air—air intercooler could be used but is not shown. The intercooler 30 is positioned adjacent to and above the supercharger outlet 42 by securing the intercooler to the cover 26 and securing the cover to an upper mounting surface 58 of the induction housing 24 to enclose the intercooler therebetween. A groove 60, FIG. 2, may be provided along the periphery of the cover 26 to receive a seal 62 to be interposed between the cover and the upper mating surface 58 of the housing 24.

The cover 26 and induction housing 24 cooperate to define a plenum 64 that is in fluid communication with the intake runners 22. The configuration of the cover 26 with a cleavage cross section is achieved by a central lengthwise bead 66 and rounded surfaces 68 in the cover 26. This cover shape provides a smooth transition and redirection of air flow exiting the central chamber 34 to the intake runners 22. The shape also provides a stiffer design compared to a flat or rectangular shaped cross section, resulting in minimal noise transmission.

FIGS. 2 and 3 illustrate the operation and flow of air through the induction assembly 20. The supercharger 28 is belt-driven by a crank pulley of the engine crankshaft, not shown, where the belt 70 is provided on a bearing drive support end 72 of the supercharger. The supercharger 28 is typically rotated at approximately two-times the engine crankshaft speed. As is known in the art, the rotation of the supercharger rotors 36 draws air through the suction inlet 38 and discharges pressurized air through the upwardly located outlet 42 of the supercharger. As a consequence of the increased pressure, the temperature of the air also increases as it flows through the supercharger 28. Therefore the pressurized air is directed to flow upwardly through the intercooler 30 to reduce the temperature for optimum engine efficiency. The cooled air flows upwardly from the intercooler 30 and into the rounded, divided plenum 64. The rounded plenum 64 provides a smooth transition to redirect the air flow into the intake runners 22. The intake runners 22 are aligned with intake ports 74 and deliver the compressed air to the engine cylinders 18, FIG. 1.

Figure 4:
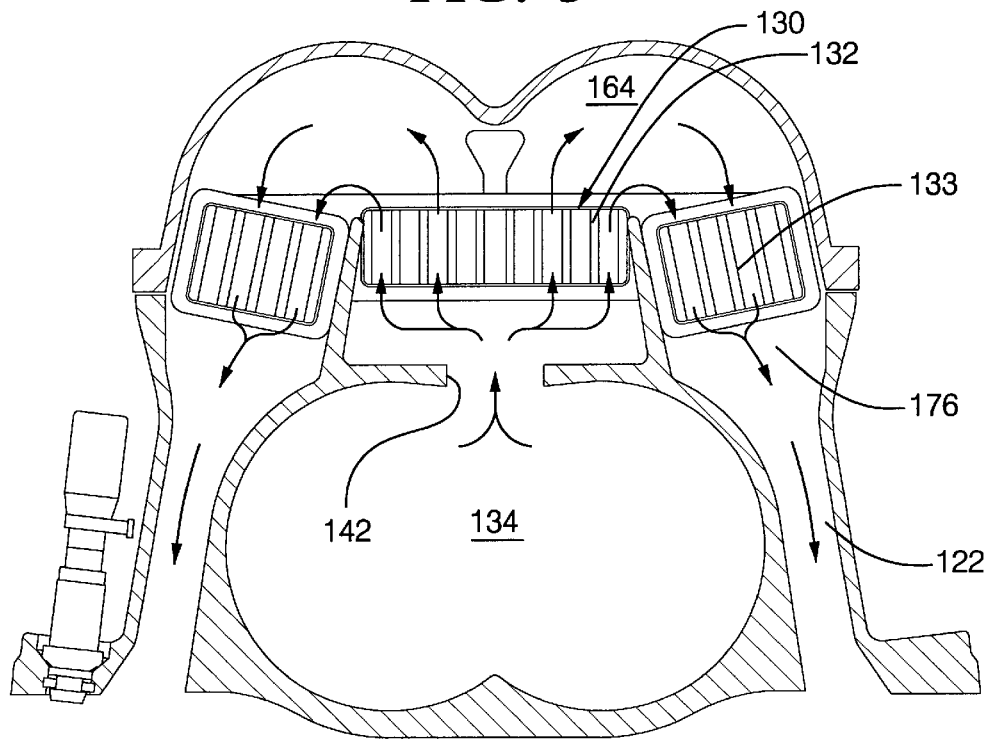
FIG. 4 is a sectional front view of a second embodiment of the induction assembly of FIG. 2, illustrating airflow.

In a second embodiment shown in FIG. 4, the intercooler 130 is comprised of a central intercooler portion 132 and an outer intercooler portion 134. The central intercooler portion 132 is positioned adjacent to and above the supercharger outlet 142. The outer intercooler portion 133 is sized to cover the entrances 176 of the intake runners 122 and is positioned adjacent to the intake runner entrances 176. This intercooler 130 configuration provides a first cooling when the charged air exits the supercharger central chamber 134 and passes through the central intercooler portion 132 and a second cooling after the air is redirected in the plenum 164 and passes through the outer intercooler portion 133 upon entering the intake runners 122.

Having a separate, easily removable cover 26 provides for ease of serviceability of the intercooler 30 as opposed to a permanently fixed cover which inhibits serviceability. The detachable cover also provides the opportunity for vibrational damping. The seal 62 may compensate for relative growth due to thermal expansion of the mating components and may acoustically isolate the cover 26 from pressure pulsations induced by the rotating rotors 36. The seal 62 reduces the likelihood of exciting the cover 26.

The foregoing description of the preferred embodiment of the invention has been presented for the purpose of illustration and description. It is not intended to be exhaustive, nor is it intended to limit the invention to the precise form disclosed. It will be apparent to those skilled in the art that the disclosed embodiment may be modified in light of the above teachings. The embodiment was chosen to provide an illustration of the principles of the invention and its practical application to thereby enable one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

I claim:

1. An induction assembly for a supercharged internal combustion engine comprising:

a supercharger having a rotor and gear plate assembly to produce pressurized air, a housing comprising, a rotor casing defining a central chamber to house said rotor and gear plate assembly, a suction inlet to introduce air to said central chamber, an outlet to discharge pressurized air from said central chamber to a plenum, and intake runners in fluid communication with said plenum, radially adjacent to the exterior of said rotor casing wherein said rotor casing comprises an inner wall of said runners, and said plenum distributes pressurized air to said intake runners.

2. An induction assembly, as defined in claim 1, further comprising a removable cover, wherein said plenum is defined by said cover and said housing.

3. An induction assembly, as defined in claim 2, said cover having a central lengthwise bead and rounded surfaces resulting in said plenum being rounded and divided longitudinally to provide a smooth redirection of air flow exiting said outlet into said intake runners for delivery to said engine.

4. An induction assembly, as defined in claim 2, further comprising an intercooler disposed between said housing and said cover and adjacent to said outlet of said housing to provide cooling of pressurized air exiting said outlet.

5. An induction assembly, as defined in claim 2, further comprising an intercooler disposed between said housing and said cover and comprising a central intercooler portion adjacent to said outlet to provide a first cooling when the pressurized air exits said central chamber and an outer intercooler portion adjacent to the entrance of said intake runners to provide a second cooling when the pressurized air enters said intake runners.

6. An induction assembly, as defined in claim 2, further comprising a seal disposed between said cover and an upper mating surface of said housing to allow thermal expansion and noise isolation of said housing to said cover while maintaining a seal.

7. An induction assembly for a supercharged internal combustion engine comprising:

a supercharger having a rotor and gear plate assembly to produce pressurized air, a housing comprising a rotor casing defining a central chamber to house said rotor and gear plate assembly, a suction inlet to introduce air to said central chamber, an outlet to discharge pressurized air from said central chamber to a plenum, and intake runners in fluid communication with said plenum, radially adjacent to the exterior of said rotor casing wherein said rotor casing comprises an inner wall of said runners, said induction assembly further comprising a removable cover, wherein said plenum is defined by said cover and said housing, said cover having a central lengthwise bead and rounded surfaces resulting in said plenum being rounded and divided longitudinally to provide a smooth redirection of air flow into said intake runners for delivery to said engine and to reduce noise radiation in said cover, and an intercooler disposed between said housing and said cover and adjacent to said outlet of said housing to provide cooling of pressurized air exiting said supercharger.

* * * * *